Patented May 15, 1951

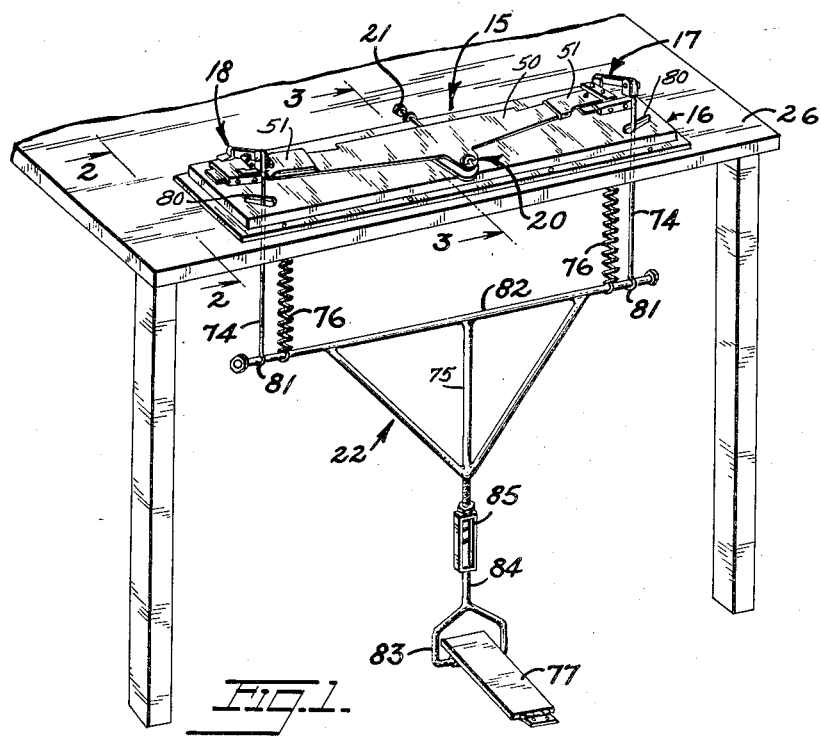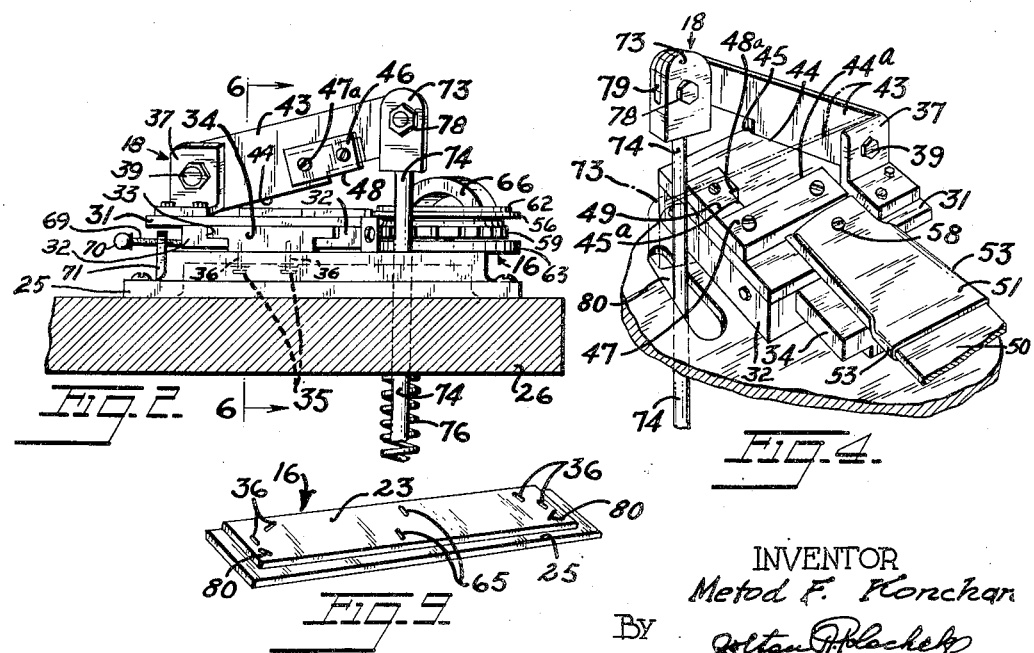

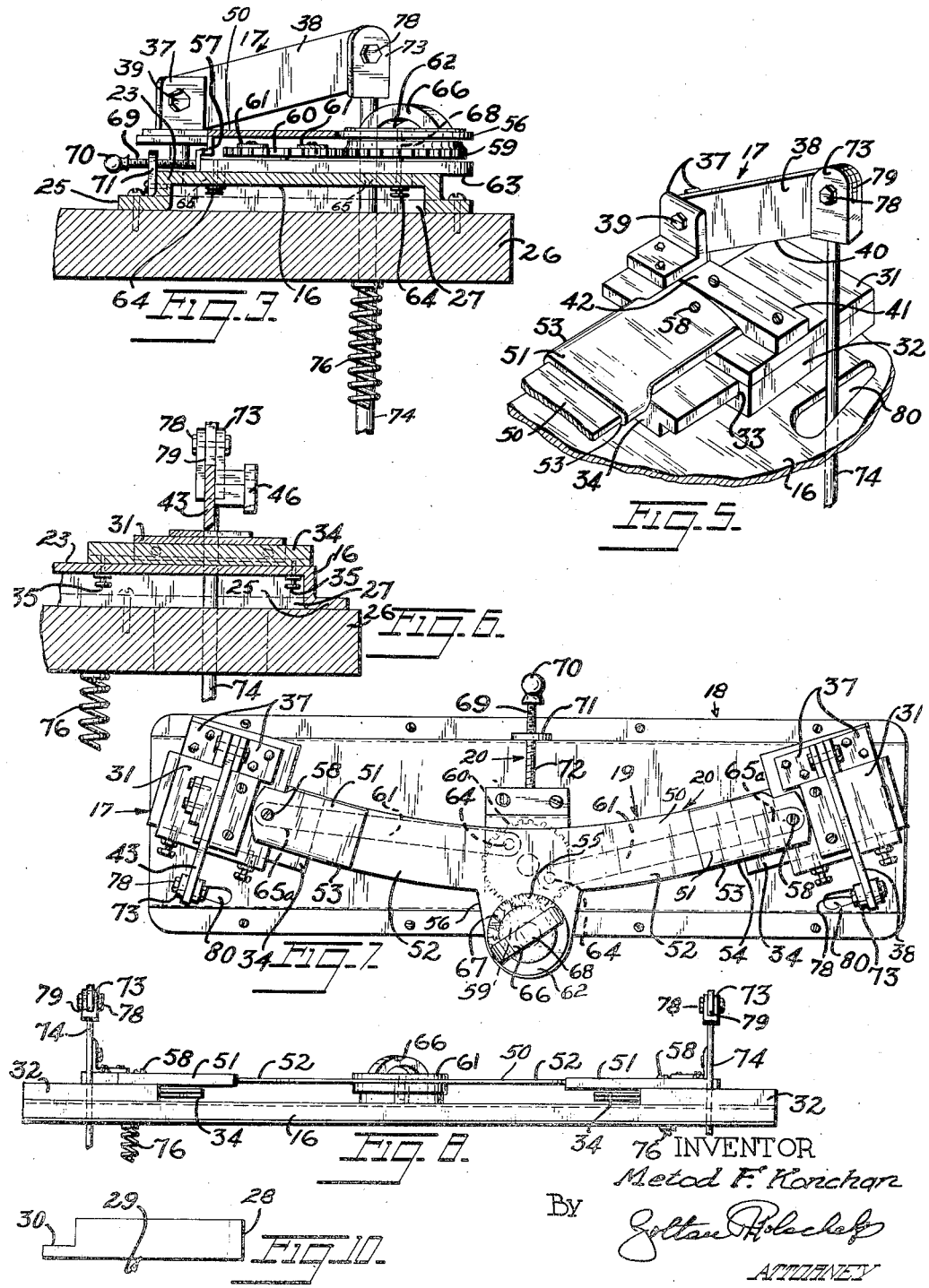

2,553,096

UNITED STATES PATENT OFFICE 2,553,096

ADJUSTABLE SWEATBAND MEASURING AND CUTTING MACHINE

Metod F. Konchan, Ridgewood, N. Y.

Application February 23, 1946, Serial No. 649,563

5 Claims. (Cl. 164—41)

This invention relates to cutting machines or devices, and more specifically to a machine especially adapted to cut sweat bands for hats.

An object of the invention is to provide a machine adapted to cut either arcuate sweat bands for use in hats whose bottom edges are higher in the sides than in front or back, or straight sweat hat bands.

Another object is to provide a machine that can be used to cut straight or shouldered ends on either type of sweat band.

Still another object is to provide a machine with two cutters that will simultaneously cut the ends of a sweat band blank to a predetermined hat size.

A further object is to provide a hat sweat band cutting machine with cutters that can be adjusted to cut ends that are parallel or at any angle to each other so that the ends when joined will form a cylindrical or conical sweat band, as desired for suitably shaped hat crowns.

Other objects include the designing of a machine that can be cheaply built, accurately adjusted and easily operated.

These and other objects are accomplished by providing a hat sweat band cutting machine comprising a base, two cutter assemblies separated by extensible plates to support a sweat band blank with its end portions in operative relation to cutter elements in the cutter assemblies, means for adjusting the angle between the cutters, means for adjusting the distance between the cutters and cutter operating means.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view of a cutting machine for hat sweat bands, said machine being constructed in accordance with the invention herein and being shown mounted on a table.

Fig. 2 is a sectional view along the line 2—2 of Fig. 1.

Fig. 3 is a sectional view along the line 3—3 of Fig. 1.

Fig. 4 is a fragmentary perspective view showing one of the cutter assemblies of the machine.

Fig. 5 is a fragmentary perspective view showing the other cutter assembly of the machine.

Fig. 6 is a sectional view along the line 6—6 of Fig. 2.

Fig. 7 is a plan view of the machine.

Fig. 8 is a front elevation of the machine.

Fig. 9 is a perspective view of the base.

Fig. 10 is a plan view of a hat sweat band having a shouldered end, the band being one of the types that can be cut by the machine described and shown herein.

In the drawings and in the specification, in which like reference numbers designate similar parts, a cutting machine 15 for hat sweat bands, embodying the invention herein, is comprised of a base 16, two cutter assemblies 17 and 18, sweat band extensible supporting means 19, cutter spacing means 20, cutter angle adjusting means 21 and cutter operating means 22 (see Fig. 1).

The base 16 is rectangular in shape and is formed with a top 23, and flanges 25 extending outwardly from the sides. The base 16 is placed on a table 26 with the under surfaces of the flanges 25 in contact with the table top, leaving a space 27 between the tops of the table and the base.

The cutter assembly 17 is adapted to cut a straight edge 28 of a hat sweat band 29, while the cutter assembly 18 is adapted to cut a shouldered end 30 thereof (see Fig. 10).

The cutter assembly 17 has a movable plate 31 which is rectangular in shape and is provided with two bars 32 having L-shaped transverse cross sections secured to its under surface forming a way 33 extending transversely thereunder. A guide plate 34 rectangular in shape and having a T-shaped transverse cross section fits in the way 33 and is secured by two bolts 35 to the base 16, each bolt extending through a slot 36, Fig. 9, therein with the bolt heads in the space 27 between the tops of the table and the base. The movable plate 31 is held above the base and can be moved freely along the guide plate 34. Two angle plates 37, facing each other and spaced apart, are secured to the top of the movable plate 31, and a straight edge cutter 38 is pivotably secured therebetween by a pivot pin 39 extending through the cutter and the angle plates. The cutter 38 has a straight cutting edge 40 and can be reciprocated to engage a straight side 41 of a shear plate 42 secured to the top of the movable plate to cut a straight edge on a strip of material by the shearing operation.

The cutter assembly 18 is similar to the cutter assembly 17 hereinabove described except for the cutter and the shear plate. The assembly 18 is provided with a movable plate 31 having two bars 32 forming a way 33 in which a guide plate 34 fits, the guide plate being secured to the base 16 by bolts 35 extending through slots 36 therein. Likewise, two angle plates 37 are secured to the movable plate 31. A shouldered end cutter 43 is pivotably secured between the angle plates by a pin 39 extending through the cutter and the angle plates. The cutter 43 has a cut-away portion with two cutting edges 44 and 45 adapted to engage corresponding edges 44ᵃ and 45ᵃ of a shear plate 47 secured to the top of the movable plate. A removable auxiliary cutter 46 is secured to the side of the cutter 43 by means of screws 47ᵃ, and has a cutting edge 48 adapted to engage a corresponding edge 48ᵃ of an auxiliary shear plate 49 secured to the top of the movable plate adjacent the shear plate 47. When the cutting edges 44, 45 and 48 engage the corresponding shear plate edges 44ᵃ, 45ᵃ and 48ᵃ, a shouldered end similar to the end 30 shown in Fig. 10 can be cut out of a sweat band blank. It will be noticed that the removal of the auxiliary cutter 46 will result in the cutting of a straight end similar to end 28 shown in Fig. 10 and similar to the end cut by the cutter 17. Thus, it is possible by a simple and quick change to cut sweat bands with two straight ends or with a straight end and a shouldered end.

The extensible supporting means for sweat bands is comprised of a center support plate 50 flanked on either end by slidable end support plates 51 which enable the overall length of the assembly to be varied. The center support plate 50 is formed with two outwardly extending arms 52 whose longitudinal axes are shown in the drawings at an angle of almost 180° with each other to accommodate arcuate sweat bands for hats whose bottom edges vary in elevation from front to center to back. The plates 50 and 51, however, are wide enough to retain straight sweat bands, and if it is so desired, the plates can be formed to be extended along a straight line instead of at an angle, all within the spirit of this invention herein.

Each end plate 51 has a portion 53 of two opposite sides bent over to form a way in which the arms 52 can fit slidably, the remainder of one of the sides being flanged to form a locating rest for the sweat band blanks. The center support plate 50 has a center mark 55 and a rounded projecting portion 56 extending from the front thereof in the plane of the plate, and a downwardly extending flange 57, see Fig. 3, opposite the projecting portion, about which more will be said hereafter. The supporting means is positioned above the base 16 with its arms 52 extending therealong, and the extreme end of each end plate 51 is rotatably secured by a bolt 58 to the top of one of the movable plates 31 of the cutter assemblies 17 and 18. Thus, the cutter movable plates 31 can move laterally with the end support plates 51, permitting adjustments in the distance between the cutters, and the angle formed by the cutting edges 40 and 44 can be altered due to the rotatable union of the end plates 51 and the cutter assembly movable plates 31.

The cutter spacing means 20 consists of a driving cogwheel 59, a driven cogwheel 60, two connecting rods 61, a dial indicator 62 and a spacing means mounting plate 63 (see Fig. 3). The cutter spacing means assembly is centrally positioned on the base 16 as follows:

The mounting plate 63 slidably is secured to the base by bolts 64 extending through slots 65 in the base, the longitudinal axis of each slot 65 being normal to the long side of the rectangular base. The cogwheels 59 and 60 are rotatably secured to the top of the mounting plate 63, the plane of rotation being parallel to the planes of the support plates, the driving cogwheel 59 being under the rounded extension 56 of the center plate, and the driven cogwheel 60 being under the center plate midway between its arms 52. The inner end of each connecting rod 61 is pivotally secured to the top of the driven cogwheel 60 near its periphery by the pin 64, said pins 64 being 180° apart so that an imaginary line joining them will pass through the center of said cogwheel. The other end 65ᵃ of each connecting rod 61 is rotatably secured to the top of one of the movable plates 31 of the cutter assemblies 17 and 18, being positioned under the end support plates 51 and being secured by the bolts 58 which extend through said support plates 51, connecting rod ends 65ᵃ and into the top of one of the movable plates 31.

The dial indicator 62 is in the form of a round plate and has a handle or grip 66 and graduated sweat band size markings 67. The dial indicator is positioned on the rounded extension 56 of the center plate 50 and can be turned thereon, turning the driving cogwheel 59 by means of a shaft 68 extending through the center plate extension 56 and firmly secured to the indicator and the driving cogwheel. From the above description, it is evident that the dial indicator can be rotated by means of its handle 66, turning the driving cogwheel 59 and the driven cogwheel 60, to which the inner ends of the connecting rods 61 are connected. The outer ends 65ᵃ of the connecting rods 61 being secured to the cutter assembly movable plates 31 will move those plates along the guiding plates 34, the end support plates 51 simultaneously sliding on the center plate extending arms 52. Thus, the distance between the cutters is varied with the supporting means 19 extending continuously from cutter to cutter, and the center marking 55 on the center plate pointing to one of the markings 67 to indicate the sweat band size being cut.

The cutter angle adjusting means 21 comprises a threaded rod 69 with an enlarged head grip 70 at one end, said rod being threaded in an upright piece 71 fastened to the base 16, the other end 72 of the rod extending through the flange 57 of the center plate 50 and being turnably connected to the spacing means mounting plate 63, see particularly Fig. 3. As the rod 69 is threaded into the fixed piece 71, the mounting plate 63 is moved along the slots 65 in the base 16, carrying the supporting means 19 and the spacing means 20 with it. The outer ends 65ᵃ of the connecting rods 61 and the end plates 51 of the supporting means being rotatably attached by the bolts 58 to the movable plates 31 causes the angle of the cutting edges 40 and 44 to vary. Thus a sweat band blank can be cut so that its ends are parallel, in which case the ends can be joined to form a cylinder, or the ends can be cut at an angle to each other, in which case a truncated cone results when the ends are joined.

The cutter operating means 22 comprises two slotted pieces 73, two rods 74, a frame 75, two springs 76 and a treadle 77. Each slotted piece 73 is rotatably secured to one of the cutters by means of a pivot pin 78, the cutters being positioned in slots 79 of the pieces 73. The rods 74 are threaded into the pieces 73 and extend through slots 80 in the base 16, terminating in loops 81 through which a cross member 82 of the frame 75 extends. The springs 76 extend between the table 26 and the cross member 82, acting to force the member upwardly, thus retaining the cutters normally in raised position. The treadle 77 has one end resting on the floor, the other end fitting in and being secured to a stirrup-shaped end 83 of an upright frame member 84 having height adjusting means 85.

While I have illustrated and described the preferred embodiment of my invention, it is to be understod that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a hat sweat band cutting machine having spaced cutter assemblies each having a guide plate and a movable plate slidably mounted therealong, means for moving the movable plates comprising a cogwheel and connecting rods, one end of each of the connecting rods being pivoted to a face of the cogwheel near its periphery and the other ends of the connecting rods being secured to the movable plates, and a calibrated member having a cogwheel to engage the first cogwheel and turn the same.

2. In a hat sweat band cutting machine having spaced cutter assemblies each having a guide plate and a movable plate slidably mounted therealong and guided thereby, means for moving the movable plates comprising a driven cogwheel, a coacting driving cogwheel and connecting rods, each of the connecting rods being rotatably joined at one of their ends to the movable plates and at the other ends to a face of the driven cogwheel near its periphery, the driving cogwheel being provided with a grip and an indicating dial with graduated markings to indicate sweat band sizes.

3. In a hat sweat band cutting machine having a base, spaced cutter assemblies each having a guide plate secured to the base and a movable plate slidably mounted on the guide plate, means for moving the movable plates comprising a mounting plate slidably secured to the base, a driving cogwheel and a driven cogwheel both secured to the mounting plate and connecting rods, each of the connecting rods being rotatably joined at one end to the movable plates and at the other end to a face of the driven cogwheel near its periphery, the driving cogwheel being provided with a grip and an indicating dial with graduated markings to indicate sweat band sizes.

4. In a cutting machine for hat sweat bands, a base, two cutter assemblies, extensible sweat band supporting plates, and cutter spacing means, each cutter assembly having a guide plate secured to the base, a movable plate slidably mounted on the guide plate, a shear plate with a straight edge secured to the movable plate, cutter supporting means extending upwardly from the movable plate and a cutter pivotally joined to the cutter supporting means and capable of engaging the straight edge of the shear plate, the sweat band supporting plates being positioned between the cutter assemblies and comprising a center plate with a center mark, two outwardly extending arms and two end plates slidably mounted on the center plate arms, each end plate being secured to one of the cutter assembly movable plates, the supporting plates being adapted to support a sweat band with its end portions extending on the shear plates in operative relation to the cutters, and the cutter spacing means being positioned between the base and the supporting plates and comprising a driven cogwheel, a coacting driving cogwheel and two connecting rods, each connecting rod being joined at one end to one of the cutter assembly movable plates and at the other end to the face of the driven cogwheel near its periphery, the driving cogwheel being provided with a shaft and an indicating dial, the shaft extending through the center supporting plate and securing the driving cogwheel to the indicating dial, and the indicating dial having a grip and graduated markings adapted to coact with the center mark of the center supporting plate to indicate the distance between the cutters in terms of hat sizes.

5. In a cutting machine for hat sweat bands, a base, two cutter assemblies, extensible sweat band supporting plates, cutter angle adjusting means, and cutter spacing means, each cutter assembly having a guide plate secured to the base, a movable plate slidably mounted on the guide plate, a shear plate with a straight edge secured to the movable plate, cutter supporting means extending upwardly from the movable plate and a cutter pivotally joined to the cutter supporting means and capable of engaging the straight edge of the shear plate, the sweat band supporting plates being positioned between the cutter assemblies and comprising a center plate with a center mark, two outwardly extending arms and two end plates slidably mounted on the center plate arms, each end plate being rotatably secured to one of the cutter assembly movable plates, the supporting plates being adapted to support a sweat band with its end portions extending on the shear plates in operative relation to the cutters, and the cutter spacing means being positioned between the base and the supporting plates and comprising a driven cogwheel, a coacting driving cogwheel and two connecting rods, each connecting rod being rotatably joined at one end to one of the cutter assembly movable plates and at the other end to the face of the driven cogwheel near its periphery, the driving cogwheel being provided with a shaft and an indicating dial, the shaft extending through the center supporting plate and securing the driving cogwheel to the indicating dial, and the indicating dial having a grip and graduated markings adapted to coact with the center mark of the center supporting plate to indicate the distance between the cutters in terms of hat sizes and the cutter angle adjusting means comprising a threaded rod and an upright piece secured to the base and having a threaded hole therethrough, the threaded rod being engaged in the upright piece and having an end acting on the center support plate to move it at an angle to its extending arms.

METOD F. KONCHAN.

REFERENCES CITED

The following references are of record in the file of this patent:

UNITED STATES PATENTS

| Number | Name | Date |
| --- | --- | --- |
| 1,484,598 | Weniger | Feb. 19, 1924 |
| 1,666,658 | Isreal | Apr. 17, 1928 |
| 1,954,237 | Bosworth | Apr. 10, 1934 |